United States Patent
Lee et al.

(10) Patent No.: US 11,402,953 B1
(45) Date of Patent: Aug. 2, 2022

(54) FINGERPRINT-TOUCH SENSING APPARATUS

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 0 days.

(21) Appl. No.: 17/543,533

(22) Filed: Dec. 6, 2021

(30) Foreign Application Priority Data

Jan. 20, 2021 (TW) .................................. 110102166

(51) Int. Cl.
*G06F 3/044* (2006.01)
*G06F 3/041* (2006.01)
*G06V 40/13* (2022.01)

(52) U.S. Cl.
CPC ............ *G06F 3/044* (2013.01); *G06F 3/0418* (2013.01); *G06F 3/04166* (2019.05); *G06V 40/1306* (2022.01); *G06F 2203/04102* (2013.01); *G06F 2203/04107* (2013.01)

(58) Field of Classification Search
CPC .... G06F 3/044; G06F 3/04166; G06F 3/0418; G06F 2203/04102; G06F 2203/04107; G06V 40/1306
See application file for complete search history.

(56) References Cited

U.S. PATENT DOCUMENTS

| | | | |
|---|---|---|---|
| 2017/0228572 A1* | 8/2017 | Lee .................... | G06V 40/1329 |
| 2018/0025203 A1* | 1/2018 | Lee ....................... | G06F 3/0443 |
| | | | 382/124 |
| 2018/0074629 A1* | 3/2018 | Lee ........................ | G02F 1/1368 |
| 2021/0191549 A1* | 6/2021 | Kim ...................... | H01L 27/323 |
| 2021/0333910 A1* | 10/2021 | Cheng .................. | G06F 3/0446 |

* cited by examiner

*Primary Examiner* — Hong Zhou
(74) *Attorney, Agent, or Firm* — Chun-Ming Shih; HDLS IPR Services

(57) ABSTRACT

A fingerprint-touch sensing apparatus includes a substrate, a sensing electrode layer, a plurality of electrode switch circuits, a plurality of capacitance-signal switch circuits respectively connected to a plurality of data lines and a capacitance-signal line, and a fingerprint-touch sensing control integrated circuit. The sensing electrode layer includes a plurality of sensing electrodes arranged in multiple columns and multiple rows. The fingerprint-touch sensing control integrated circuit controls the capacitance-signal switch circuits and the electrode switch circuits to select one or more sensing electrodes to conduct sensing, thus providing the flexible function of fingerprint sensing or touch sensing.

22 Claims, 11 Drawing Sheets

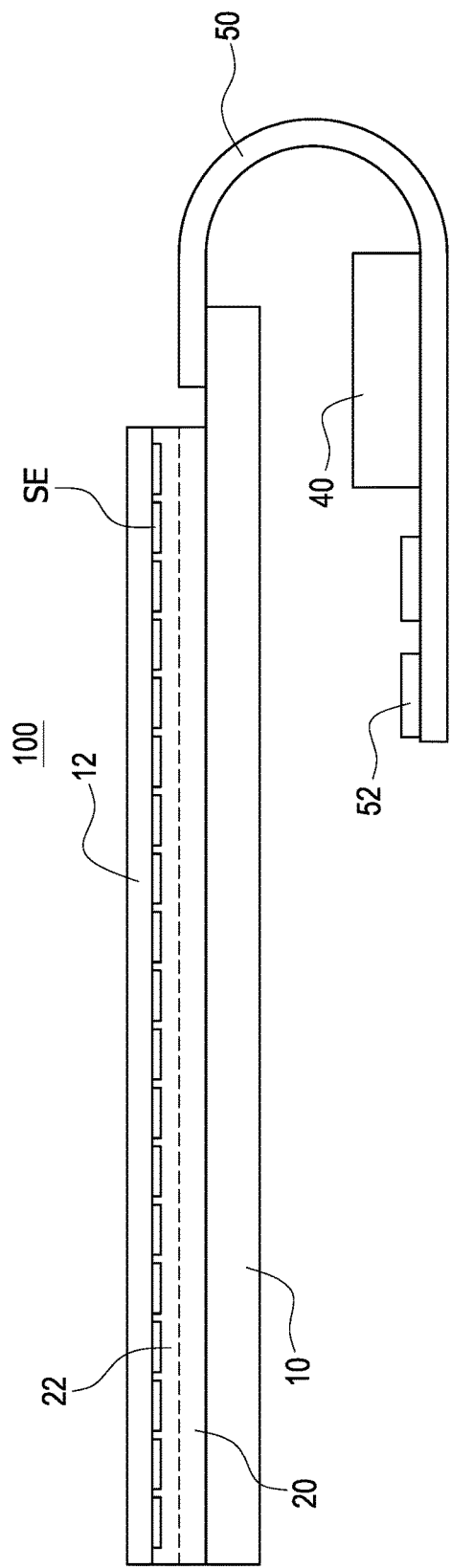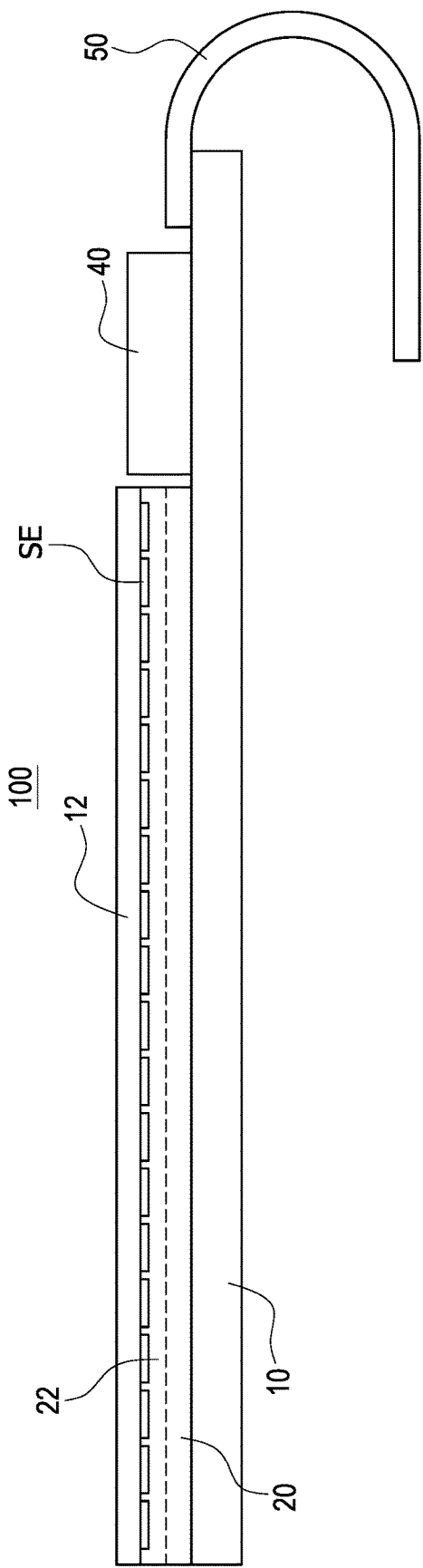

FINGERPRINT-TOUCH SENSING APPARATUS

BACKGROUND

Technical Field

The present disclosure relates to a fingerprint-touch sensing apparatus, especially to a fingerprint-touch sensing apparatus to flexibly realize fingerprint sensing or touch sensing by organizing and driving the sensing electrodes.

Description of Related Art

Touch control becomes essential function for smart electronic products. Owing to the rapid growing of electronic business, the bio-identification function is also necessary. The prime technology for bio-identification function is fingerprint identification. It is an important issue to integrate the fingerprint identification within the display panel as the frameless, full-screen display smartphone become prevailing. The current main stream technology for in-display fingerprint identification is supersonic and optical technology; however, they have disadvantages such as high cost, difficult alignment, and optical path problem. Besides, it also has the problems of smaller sensing area and edge-placement limitation, as well as requiring additional touch controller. Moreover, the laptop computer has the demanding of integrating touch control sensing and fingerprint identification.

The present disclosure is intended to provide an apparatus to integrally provide larger-area fingerprint sensing and touch sensing. The fingerprint-touch sensing apparatus of the present disclosure can be applied to in-display full-screen fingerprint identification and touch control, or replace the touch pad for 3C products. Besides, the present disclosure also provides a fingerprint-touch sensing apparatus capable of using ordinary pen for hand-writing input.

In view of this, the inventors have devoted themselves to the aforementioned related art, researched intensively try to solve the aforementioned problems.

SUMMARY OF THE DISCLOSURE

It is an object of the present disclosure to provide a fingerprint-touch sensing apparatus to flexibly realize fingerprint sensing or touch sensing.

Accordingly, the present disclosure provides a fingerprint-touch sensing apparatus comprising:

a substrate;

a sensing electrode layer arranged on one side of the substrate, the sensing electrode layer comprising: a plurality of sensing electrodes arranged in multiple columns and multiple rows; a plurality of electrode switch circuits, each of the electrode switch circuits being corresponding to one of the sensing electrodes and comprising at least one transistor switch; a plurality of data lines extended along a first direction, each of the data lines being connected to the electrode switch circuits; a plurality of gate lines extended along a second direction, each of the gate lines being connected to the electrode switch circuits; a plurality of capacitance-signal lines arranged on lateral side of the substrate; a plurality of data shielding lines arranged beside each of the data lines, each of the data lines being corresponding to at least one of the data shielding lines; a plurality of capacitance-signal shielding lines arranged beside each of the capacitance-signal lines, each of the capacitance-signal lines being corresponding to at least one of the capacitance-signal shielding lines; a plurality of capacitance-signal switch circuits arranged on lateral side of the substrate, each of the capacitance-signal switch circuits being connected to at least one of the data lines and at least one of the capacitance-signal lines;

a fingerprint-touch sensing control integrated circuit configured to control the capacitance-signal switch circuits and the electrode switch circuits to sequentially or randomly select one or a plurality of the sensing electrodes for conducting fingerprint sensing or touch sensing; and a flexible circuit board with one end connected to one side of the substrate.

According to one aspect of the present disclosure, the fingerprint-touch sensing apparatus further includes a panel display comprising a display screen, the substrate is placed on a side of the display screen facing a user to facilitate fingerprint sensing or touch sensing, the sensing electrode layer covers a display area of the panel display, the plurality of sensing electrodes being transparent conductive electrodes.

In the fingerprint-touch sensing apparatus of the present disclosure, by providing a plurality of capacitance-signal switch circuits and a plurality of electrode switch circuits, capacitance change can be flexibly sensed for a single sensing electrode, or multiple sensing electrode (such as a sensing electrode array). Therefore, fingerprint sensing and touch sensing can be flexibly performed under the same physical sensing electrode architecture.

BRIEF DESCRIPTION OF THE DRAWINGS

FIG. 1C shows a sectional view of the fingerprint-touch sensing apparatus according to still another embodiment of the present disclosure.

FIG. 1D shows a sectional view of the fingerprint-touch sensing apparatus according to still another embodiment of the present disclosure.

DETAILED DESCRIPTION

Figure 1A:
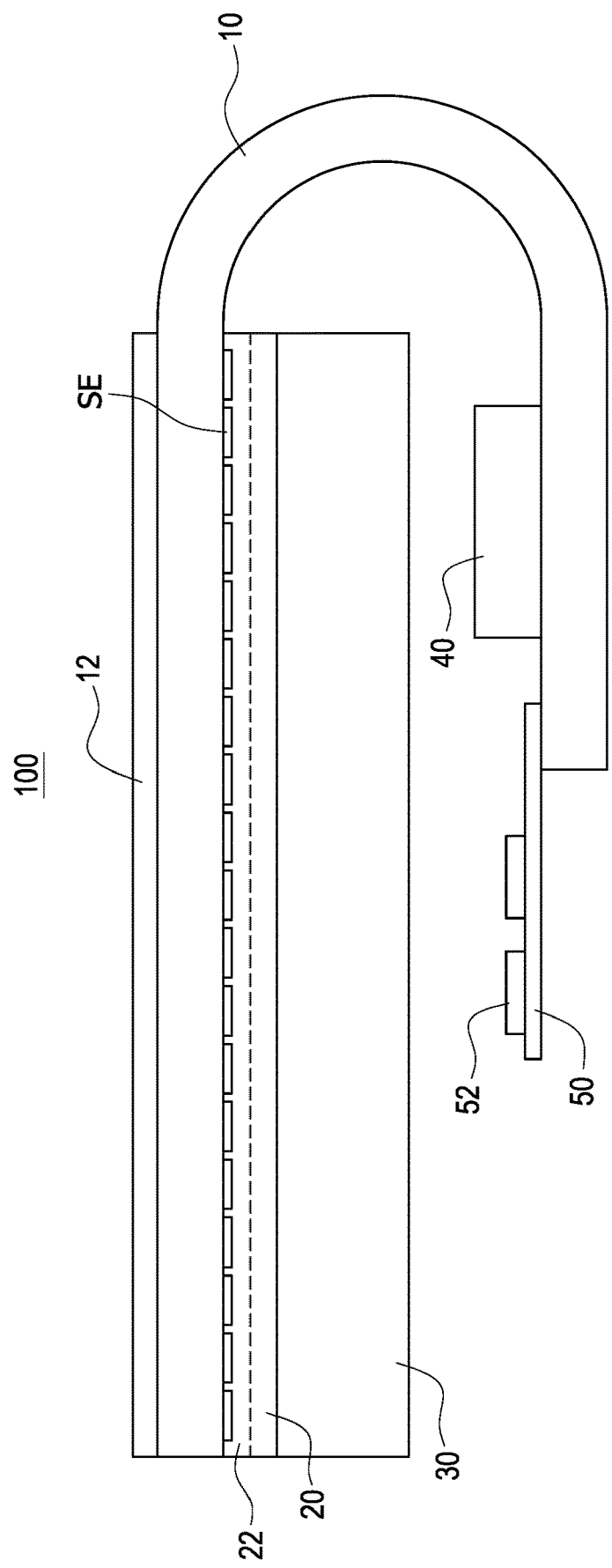
FIG. 1A shows a sectional view of the fingerprint-touch sensing apparatus according to an embodiment of the present disclosure.

The technical contents of this disclosure will become apparent with the detailed description of embodiments accompanied with the illustration of related drawings as follows. It is intended that the embodiments and drawings disclosed herein are to be considered illustrative rather than restrictive.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper," "lower," "left," "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It should be understood that when an element is referred to as being "connected to" or "coupled to" another element, it may be directly connected to or coupled to the other element, or intervening elements may be present.

Figure 2A:
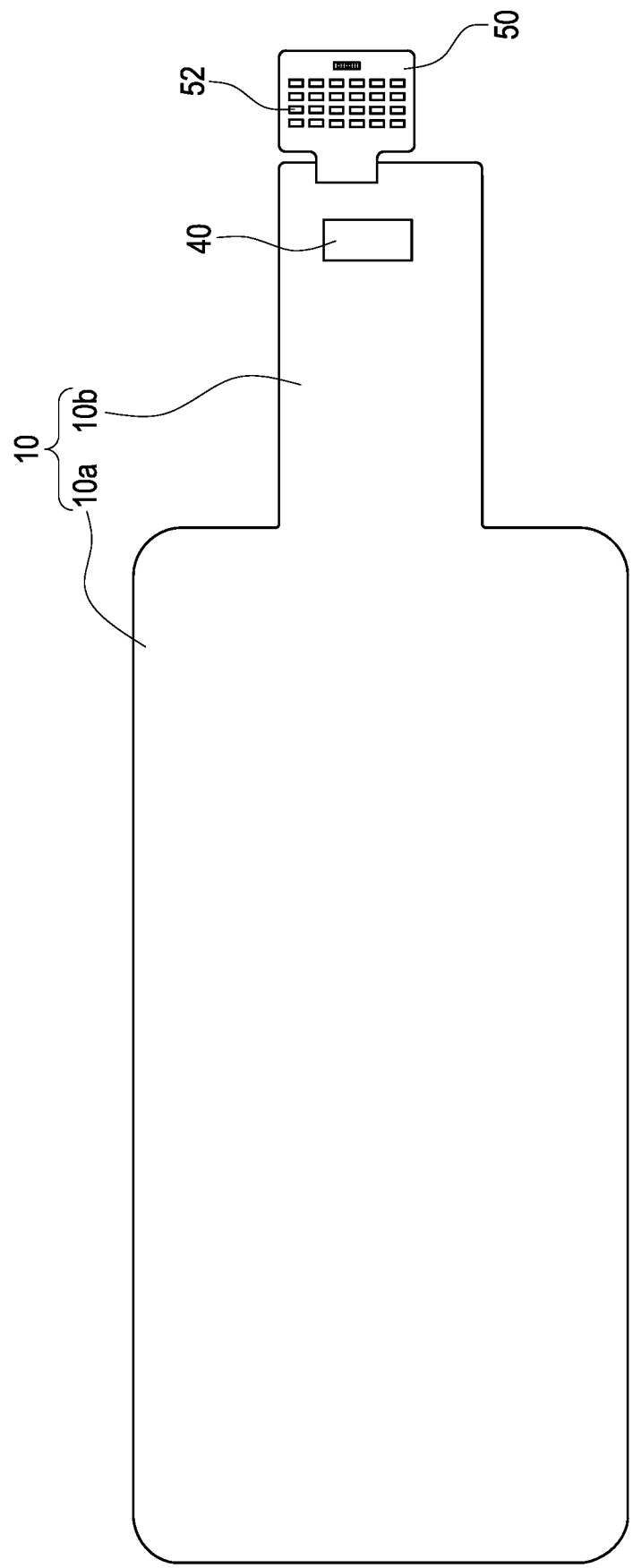
FIG. 2A shows partial components of the fingerprint-touch sensing apparatus.
Figure 3A:
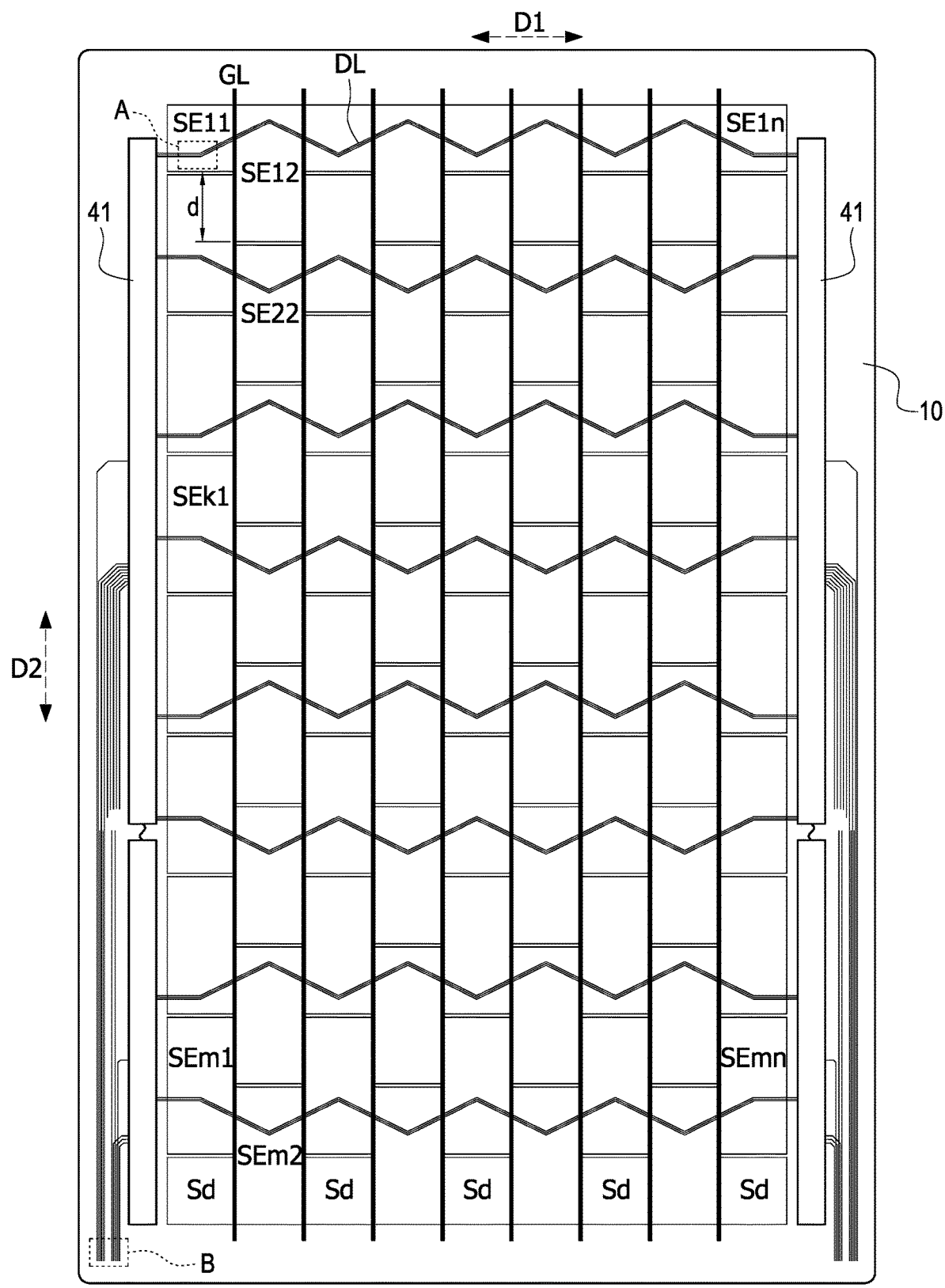
FIG. 3A shows the detailed sensing electrode layer and related components in the fingerprint-touch sensing apparatus.

FIG. 1A shows a sectional view of the fingerprint-touch sensing apparatus 100 according to an embodiment of the present disclosure. FIG. 2A shows partial components of the fingerprint-touch sensing apparatus 100. FIG. 3A shows the detailed sensing electrode layer 20 and related components in the fingerprint-touch sensing apparatus 100.

As shown in those figures, the fingerprint-touch sensing apparatus 100 according to an embodiment of the present disclosure includes, for example, a substrate 10; a sensing electrode layer 20 arranged on one side of the substrate 10 and including a plurality of sensing electrodes SE arranged in multiple-column and multiple-row on the substrate 10; a plurality of electrode switch circuits 22 each corresponding to one sensing electrode SE and including at least one transistor switch Q (such as a thin film transistor switch); a plurality of data lines DL extended along a first direction D1 and each connected to the plurality of electrode switch circuits 22; a plurality of gate lines GL extended along a second direction D2 and each connected to the plurality of electrode switch circuits 22; a plurality of capacitance-signal lines CL arranged on lateral side of the substrate 10; a plurality of data shielding lines DLS arranged beside each data line DL (each data line DL is corresponding to at least one data shielding lines DLS); and a plurality of capacitance-signal shielding lines CLS each arranged beside each capacitance-signal line CL (each capacitance-signal line CL is corresponding to at least one capacitance-signal shielding line CLS). Besides, the fingerprint-touch sensing apparatus 100 further includes a plurality of multiple-to-one (multiple input/one output) capacitance-signal switch circuits 41 arranged on lateral side of the substrate 10, each of the capacitance-signal switch circuits 41 is connected to at least one data line DL and at least one capacitance-signal line CL. The fingerprint-touch sensing apparatus 100 further includes a fingerprint-touch sensing control integrated circuit 40 controlling the capacitance-signal switch circuits 41 and the electrode switch circuits 22 to sequentially or randomly select one or more sensing electrode(s) to conduct fingerprint or touch sensing, and a flexible circuit board 50 with one end attached to (laminated on) one side of the substrate 10.

According to one embodiment of the present disclosure, the physical area of one sensing electrode SE is substantially smaller than that of the conventional touch sensing electrode. For example, the area of each sensing electrode SE is not larger than 40,000 square micrometers (μm). Therefore, if the fingerprint-touch sensing control integrated circuit 40 selects one sensing electrode SE or few sensing electrodes SE (such as four sensing electrodes SE) for sensing, the resolution is fine enough to sense information about ridge and valley of fingerprint. Besides, the fingerprint-touch sensing control integrated circuit 40 may control data line DL and gate line GL (detail thereof will be given later) to select sensing electrodes of multiple rows and single column, or sensing electrodes of single row and multiple columns, sensing electrodes of multiple rows and multiple columns (namely, a sensing electrode array or matrix) at one time (single time). In other word, the sensing electrodes of multiple rows and single column, or the sensing electrodes of single row and multiple columns, or the sensing electrodes of multiple rows and multiple columns may constitute a logical single sensing electrode to reduce the total sensing number and sensing task. The provision of the fingerprint-touch sensing control integrated circuit 40 may reduce the sensing time for electrodes to facilitate the touch sensing. The prior art sensing electrode suffers trade off problem between fingerprint sensing and touch sensing. Fingerprint sensing is intended for smaller sensing area (such as area corresponding to single finger) and longer time sensing (such as frame rate of 3-4 frames/second (fts)). Touch sensing is intended for larger sensing area (such as swipe unlock or APP operation) and shorter time operation (such as frame rate of 60-120 frames/second (fts)). Therefore, the sensing scheme for sensing electrode of smaller area has slow response to hinder touch sensing; the sensing scheme for sensing electrode of larger area has rough resolution to hinder fingerprint sensing. According to the present disclosure, the entire screen or partial screen (such as half screen) is provided with sensing electrodes with area small enough to sense fingerprint. Besides, the fingerprint-touch sensing apparatus 100 of the present disclosure adopts above-mentioned logically-configured touch sensing electrode and signal driving mechanism, thus realize fingerprint sensing for whole screen or partial screen as well as whole scree touch sensing.

With reference back to FIG. 1A, according to an embodiment, the fingerprint-touch sensing apparatus 100 includes, for example from top (toward user operation direction) to bottom, a protection layer 12, a substrate 10, a sensing electrode layer 20, and a display 30. Besides, the fingerprint-touch sensing apparatus 100 further includes a fingerprint-touch sensing control integrated circuit (IC) 40 arranged on one face of the substrate 10, a flexible circuit board 50 connected to one end of the substrate 10 and passive elements 52 arranged on the flexible circuit board 50. The fingerprint-touch sensing apparatus 100 shown in FIG. 1A is, for example, arranged on a display 30 of a portable electronic device (such as a smartphone) and the substrate is made of transparent material such as transparent polymer material or ultra-thin glass (UTG). According to one embodiment of the present disclosure, the transparent polymer material is, for example, polyimide (PI). According to one embodiment of the present disclosure, the thickness of the ultra-thin glass is, for example, smaller than 30 micro meters. Besides, as shown in FIG. 1A, the sensing electrode layer 20 includes a plurality of sensing electrodes SE arranged in multiple-row and multiple-column on the substrate 10. The sensing electrode layer 20 further includes a plurality of electrode switch circuits 22, each is corresponding to one associated sensing electrode SE. Each of the electrode switch circuits 22 includes at least one transistor switch such as the element Q shown in FIG. 4A. The embodiment shown in FIG. 1A only depicts the schematic view of the layered structure of the fingerprint-touch sensing apparatus 100 and it is not intended to show the actual device size. According to one embodiment, the sensing electrode layer 20 may be grown from the substrate 10 along a direction toward the display 30. The face of the substrate 10 on which the sensing electrode layer 20 is arranged is on the side toward that the display screen of the displayer 30 faces the operator. Namely, the face of the substrate 10 on which the sensing electrode layer 20 is not arranged is toward the operator (user).

Therefore, when the smart phone using the fingerprint-touch sensing apparatus 100 needs to replace the protection layer 12 (such as a protection adhesive), the substrate 10 still can provide sufficient protection to the sensing electrode layer 20. Besides, even not clearly shown in FIG. 1A, the sensing electrode SE and the electrode switch circuits 22 can be arranged in different depths in the sensing electrode layer 20 (viewing from a position atop the substrate 10 and toward the displayer 30). In the embodiment shown in FIG. 1A, the sensing electrode SE is closer to the substrate 10 than the electrode switch circuits 22; namely, it first grows the sensing electrode SE and then grows the electrode switch circuits 22. However, according to another embodiment of the present disclosure, the electrode switch circuits 22 are closer to the substrate 10 than the sensing electrodes SE; namely, it first grows the electrode switch circuits 22 and then grows the sensing electrodes SE. According to the present disclosure, the sensing electrode SE and the electrode switch circuits 22 may also be arranged at substantially the same depth and grown alternatively. According to one embodiment of the present disclosure, the sensing electrode SE is made of transparent conductive materials such as ITO (indium tin oxide); the transistors Q in the electrode switch circuits 22 are also made of transparent materials such as transparent thin film transistor to prevent from blocking the display 30. The sensing electrodes SE in the sensing electrode layer 20 are arranged between the user finger (or stylus) and the display 30, the capacitance variation is larger and the influence of the noise in the display 30 can be prevented.

Refer to FIG. 2A, the wider portion 10a of the substrate 10 corresponding to the sensing electrode layer 20 has a wider width and the substrate 10 further includes a narrower substrate extension part 10b extended from the wider portion 10a. The fingerprint-touch sensing control integrated circuit 40 is arranged on the narrower substrate extension part 10b and the flexible circuit board 50 is connected to one end of the narrower substrate extension part 10b at one side of the substrate 10. With reference also to FIG. 1A, the substrate 10 is, for example, a flexible substrate with one or more bending. By the bending of the substrate 10, the fingerprint-touch sensing control integrated circuit 40 can be arranged below the display 30 to simplify the fabrication and packaging of the portable electronic device. Besides, the flexible circuit board 50 is connected to one end of the substrate 10 through the narrower substrate extension part 10b and the flexible circuit board 50 includes passive elements 52 or connector thereon to provide further control to the fingerprint-touch sensing control integrated circuit 40. For example, a controller of the portable electronic device may perform control to the fingerprint-touch sensing control integrated circuit 40, or signal processing and filtering function may be provided to the fingerprint-touch sensing control integrated circuit 40.

Refer to FIG. 3A, this figure shows more detailed view for the sensing electrode layer 20 and related elements in the fingerprint-touch sensing apparatus 100. The sensing electrode layer 20 includes a plurality of sensing electrodes SE arranged in multiple-row and multiple-column on the substrate 10. For example, FIG. 3A shows the sensing electrodes SE11 . . . SEk1 . . . SEm1 arranged along the first column, the sensing electrodes SE12, SE22 . . . SEm2 arranged along the second column . . . and sensing electrodes SE1n . . . SEmn arranged along the n-th column. The sensing electrodes in adjacent columns or adjacent rows are staggered to each other. As shown in FIG. 3A, the first sensing electrode SE11 in the first column is staggered to the first sensing electrode SE12 in the second column. The above-mentioned "staggered" is, for example but not limited to, that the bottom of the first sensing electrode SE11 in the first column is not aligned (is separated with) the bottom of the first sensing electrode SE12 in the second column. For example, they are separated by a height d. Besides, even in the embodiment shown in FIG. 3A, the sensing electrodes at adjacent columns are staggered to each other. According to the spirit of the present disclosure, the sensing electrodes at adjacent row are staggered to each other. Because the sensing electrodes in adjacent rows (or adjacent columns) are staggered to each other, bricklayer arrangement for the sensing electrodes can be provided. Therefore, during sensing operation, the sensing results of the four adjacent sensing electrodes can be integrated together to enhance sensing accuracy. Besides, to prevent the visual impact from the staggered electrodes, dummy electrodes Sd can be further provided on the sensing electrode layer 20.

As shown in FIG. 3A, the gate lines GL extend along the second direction D2 (column direction) such as a straight line, while the data lines DL extend along the first direction (row direction) D1 along a zigzag path to comply with the sensing electrodes staggered between two adjacent columns. In other words, the sensing electrodes SE in adjacent columns are staggered to each other such that a single zigzag data line DL can be used to connect a plurality of sensing electrodes in the same row but different columns. The data line DL is arranged in zigzag manner and the Mura problem in display can be reduced, display uniformity can be enhanced and the resistance of the data line DL can be reduced when the data line DL is made of non-transparent conductive materials (such as metal conductive lines with line width no more than 10 μm). Besides, according to an embodiment of the present disclosure, the gate line GL can be made of transparent conductive materials due to less demand on resistance value and the operation of the fingerprint-touch sensing apparatus 100 is not influenced. In other words, according to the present disclosure, the data line DL and the gate line GL can be made of different material to enhance process flexibility. However, under potential process requirement, the data line DL and the gate line GL can be made of the same material. Namely, the protection scope is not limited to above embodiments. For example, the gate lines GL may also have and zigzag and be made of non-transparent conductive materials (such as metal conductive lines with line width no more than 10 μm).

Refer to FIG. 3A, a plurality of multiple-to-one capacitance-signal switch circuits 41 (hereinafter, capacitance-signal switch circuits) are arranged on lateral side of the substrate 10 (namely outside the area of the sensing electrodes). Each of the capacitance-signal switch circuits 41 is connected to multiple data lines DL and a capacitance-signal line CL, where the capacitance-signal lines CL are arranged on lateral side of the substrate to provide electric connection between the fingerprint-touch sensing control integrated circuit 40 and the capacitance-signal switch circuits 41. By the provision of the capacitance-signal switch circuits 41 and the connection thereof between one capacitance-signal line CL and multiple data lines DL, one capacitance-signal line CL can be employed to sense the capacitance change for multiple sensing electrodes or capacitance change for one sensing electrode, thus achieve more flexible fingerprint/touch sensing, which will be detailed later with reference to FIG. 4A.

Figure 3B:
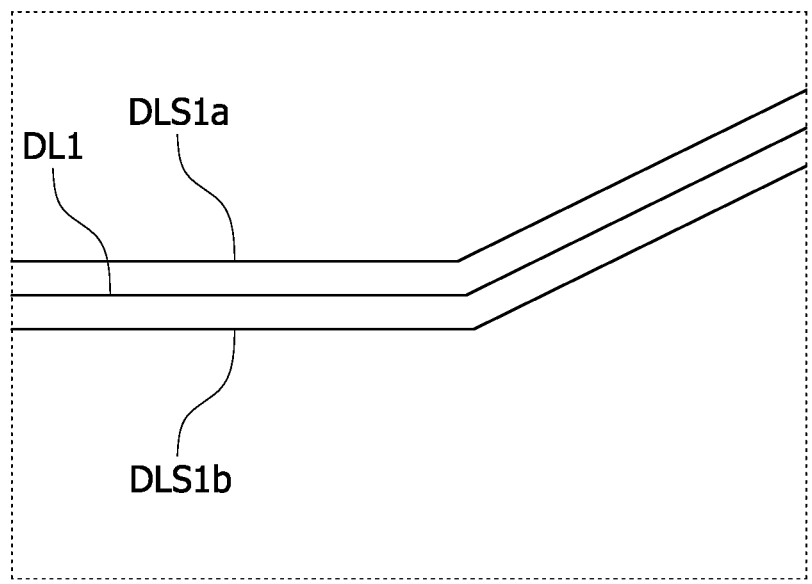
FIG. 3B shows a partially enlarged view for portion A in FIG. 3A.

Refer to FIG. 3B, this figure shows a partially enlarged view for portion A in FIG. 3A. The fingerprint-touch sensing apparatus 100 further includes a plurality of data shielding lines (such as the data shielding lines DLS1a, DLS1b) arranged beside each of the data line DL (for example, the data shielding lines DLS1a, DLS1b are arranged beside the data line DL1) to provide shielding to the data line DL and reduce the influence of noise. Even though in FIG. 3B each data line is provided with two data shielding lines beside it, according to the present disclosure, each data line may be provided with one data shielding line beside it to provide shielding. Besides, suitable bias can be applied to the data shielding lines to further reduce cross talk and enhance fingerprint sensing accuracy, which will be detailed later.

Figure 3C:
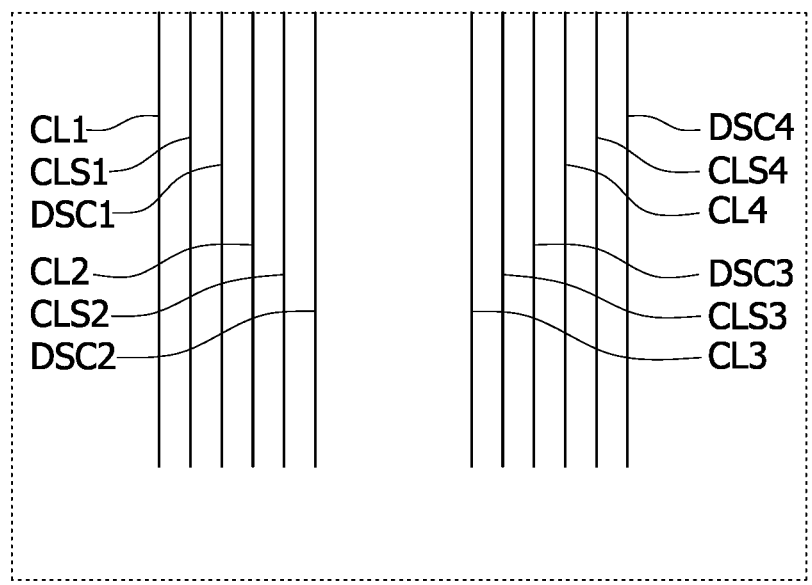
FIG. 3C shows a partially enlarged view for portion B in FIG. 3A.

Refer to FIG. 3C, this figure shows a partially enlarged view for portion B in FIG. 3A. The portion B is corresponding to the connection between the capacitance-signal switch circuits 41 and the fingerprint-touch sensing control integrated circuit 40. As shown in this figure, below lines can be provided for the capacitance-signal switch circuits 41: capacitance-signal line CL1, capacitance-signal shielding line CLS1, data selection control line DSC1, capacitance-signal line CL2, capacitance-signal shielding line CLS2, data selection control line DSC2, capacitance-signal line CL3, capacitance-signal shielding line CLS3, data selection control line DSC3, capacitance-signal line CL4, capacitance-signal shielding line CLS4, data selection control line DSC4 . . . and so on. The capacitance-signal shielding line CLS is arranged beside the corresponding capacitance-signal line CL to provide shielding and reduce noise influence. Even in FIG. 3C each of the capacitance-signal lines CL is provided with one capacitance-signal shielding line CLS beside it; according to the present disclosure, each of the capacitance-signal lines CL may be provided with two capacitance-signal shielding lines CLS beside it. Namely, similar to the arrangement in FIG. 3B, two capacitance-signal shielding lines CLS are arranged on two sides of the capacitance-signal line CL. Besides, suitable bias can be applied to the capacitance-signal shielding line CLS to further reduce cross talk and enhance fingerprint sensing accuracy, which will be detailed later.

Figure 4A:
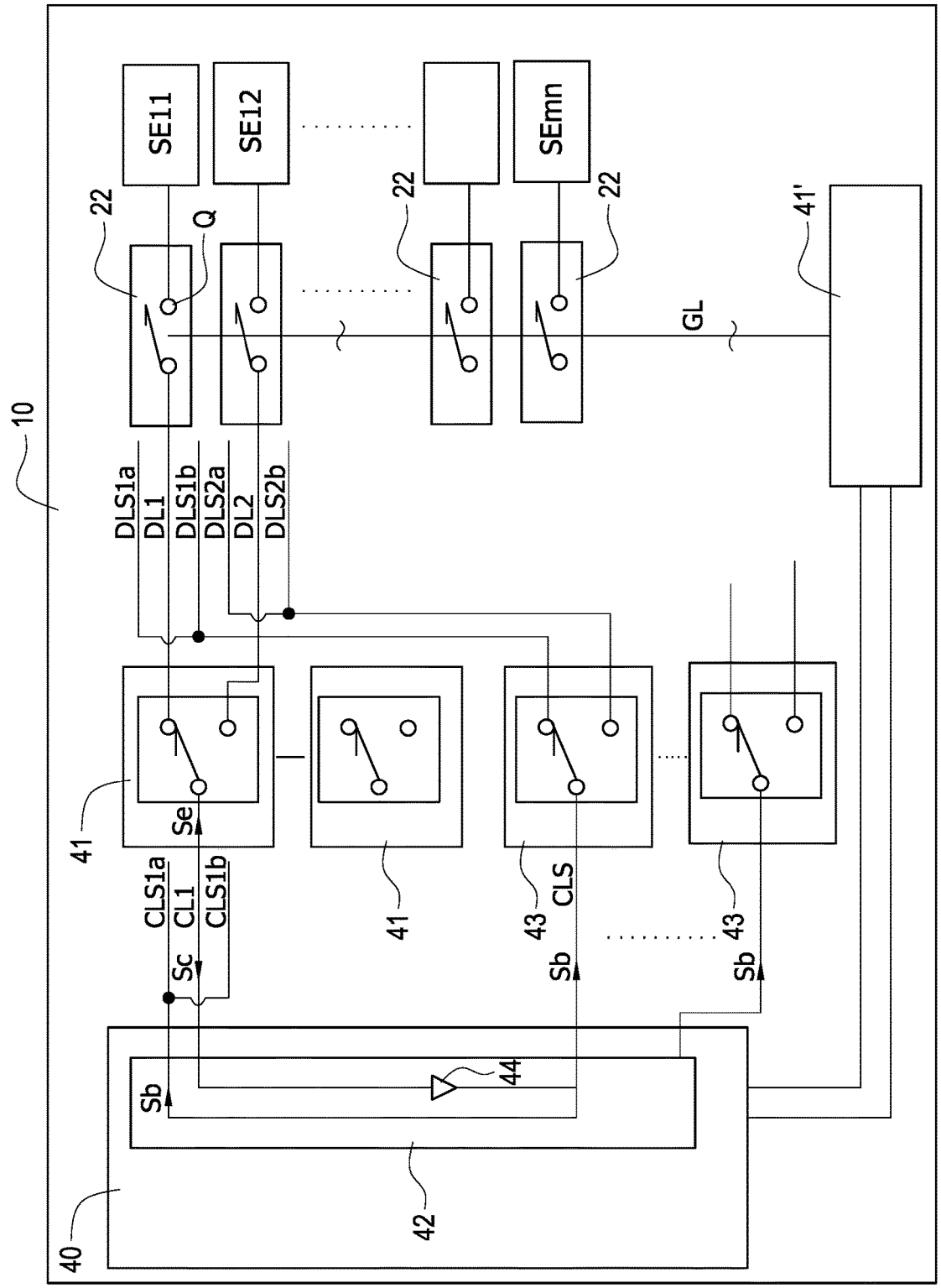
FIG. 4A shows the circuit diagram illustrating the operation of the fingerprint-touch sensing apparatus.

FIG. 4A shows the circuit diagram illustrating the operation of the fingerprint-touch sensing apparatus 100. According to one embodiment, the fingerprint-touch sensing control integrated circuit 40 includes, for example, a self-capacitance measuring circuit 42. In fingerprint sensing or touch sensing operation, the self-capacitance measuring circuit 42 sends a capacitance-excitation signal Se to the capacitance-signal switch circuits 41 through the capacitance-signal line (such as the capacitance-signal line CL1 shown in FIG. 4A). The capacitance-excitation signal Se is sent from the capacitance-signal switch circuits 41 to one electrode switch circuit 22 (or multiple electrode switch circuits 22) through one corresponding data line DL (or multiple data lines DL). Afterward, the capacitance-excitation signal Se is sent from the electrode switch circuit 22 to one or more selected sensing electrode SE. At the same time, the self-capacitance measuring circuit 42 obtains a capacitance-sensing signal Sc from the selected sensing electrode SE and through the corresponding electrode switch circuit 22, the data line DL, the capacitance-signal switch circuits 41 and the capacitance-signal line CL, thus conducting fingerprint sensing or touch sensing operation. With reference also to FIG. 3A, the capacitance-signal switch circuits 41 is, for example, a multiplexer and may be connected between a capacitance-signal line CL and multiple data lines DL (such as 8, 10 or more data lines DL), thus saving the number of wirings on edge of the substrate 10. Besides, the fingerprint-touch sensing apparatus 100 may control (regulate) the capacitance-signal switch circuits 41 to select the number of the data line DL corresponding to the sensing electrode to be sensed. For example, the fingerprint-touch sensing apparatus 100 may send control signal to the data selection control line DSC to control the capacitance-signal switch circuits 41 to select multiple rows of sensing electrodes at the same time or one row of sensing electrodes. The fingerprint-touch sensing apparatus 100 may control (regulate) a multiplexer 41' to select the number of the gate line GL corresponding to the sensing electrode to be sensed. For example, the fingerprint-touch sensing apparatus 100 may send control signal to the multiplexer 41' to select multiple columns of sensing electrodes at the same time or one column of sensing electrodes. In this manner, multiple sensing electrodes SE can be wired to one logical touch sensing electrode to provide whole-screen fingerprint sensing/touch sensing function.

More particularly, according to one embodiment of the present disclosure, the area of each sensing electrode is enough to provide the resolution for fingerprint identification. If one sensing electrode or few sensing electrodes (such as four and in above-mentioned bricklayer arrangement) is selected, the resolution is fine enough to conduct fingerprint sensing and thus achieve fingerprint identification. According to the present disclosure, the fingerprint-touch sensing control integrated circuit 40 may control the capacitance-signal switch circuits 41 to select one row (or few rows) of sensing electrode, and may control the gate lines (for example, through the multiplexer 41') to select one column (or few columns) of sensing electrode to fulfill above sensing scheme. Therefore, the peak and valley of fingerprint can be precisely sensed.

Besides, the fingerprint-touch sensing control integrated circuit 40 may control the capacitance-signal switch circuits 41 to select predetermined rows of sensing electrodes and use the gate line (for example, through the control of the multiplexer 41') to control the multiple electrode switch circuits 22 to select predetermined columns of sensing electrodes, thus organize (program) sensing electrodes in substantially array manner. In the present disclosure, the adjacent rows (or adjacent columns) of sensing electrodes are staggered to each other. Therefore, the selected rows and columns of sensing electrodes are not in exact array manner, but in substantially array manner. With reference also to FIGS. 3A and 3C, the fingerprint-touch sensing control integrated circuit 40 may sends control signals to the data selection control line DSC to control the capacitance-signal switch circuits 41 to select multiple rows of sensing electrodes such as 8 rows of sensing electrodes. The fingerprint-touch sensing control integrated circuit 40 may sends control signals to the gate lines (for example, sending control signals through the multiplexer 41') to control the corresponding electrode switch circuits 22 and to select multiple columns of sensing electrodes such as 8 columns of sensing electrodes. By above scheme, an 8×8 sensing electrode array (matrix) can be selected (organized). However, the above description is only for demonstration and not to limit the scope of the present disclosure. Based on the architecture shown in FIGS. 3A and 4A, it can rapidly sense whether overall capacitance change occurs in a sensing electrode array (namely, a single logical sensing electrode) to achieve touch sensing. The scope of the present disclosure is not limited by above example. For example, by using above electrode switch circuits 22, sensing electrodes array of various sizes and locations can be selected in the whole sensing electrode layer 20.

With reference back to FIG. 4A, as shown in this figure, after the self-capacitance measuring circuit 42 receives the capacitance-sensing signal Sc, the self-capacitance measuring circuit 42 uses a driver circuit (such as a non-inverting amplifier) 44 to process the capacitance-sensing signal Sc into a shielding signal Sb. The shielding signal Sb has substantially the same frequency and the same phase as that of the capacitance-sensing signal Sc and can be applied to the data shielding lines DLS and the capacitance-signal shielding lines CLS to eliminate the influence of stray capacitance and reduce interference, to enhance signal to noise ratio and sensing accuracy.

Figure 5A:
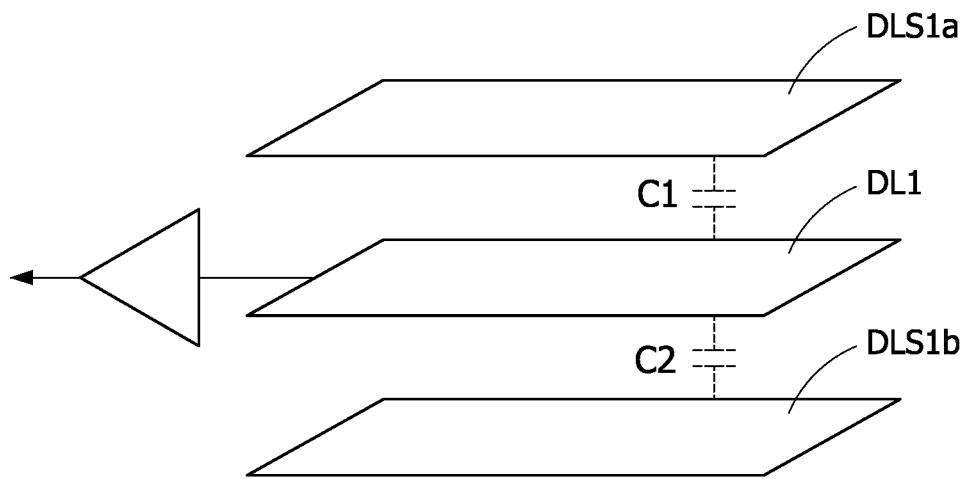
FIG. 5A is a schematic view showing the related position of the data line and the data shielding line.
Figure 5B:
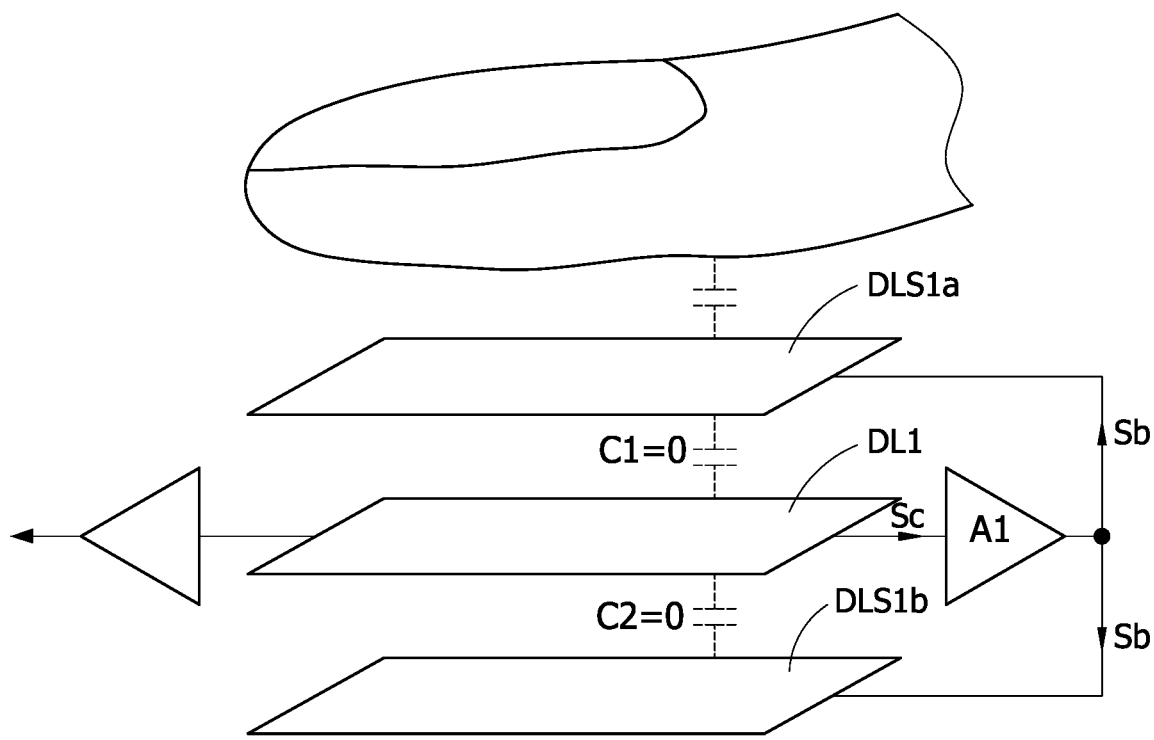
FIG. 5B is a schematic view showing the data shielding line and the application of the data shielding signal.

With reference also to FIGS. 5A, 5B and 3B, data shielding lines can be provided at the vicinity of the data line, for example, the data shielding line DLS1$a$ and the data shielding line DLS1$b$ are respectively arranged on top and bottom of the data line DL1. The above mentioned "top" and "bottom" can be referred to the direction/location when user operates the fingerprint-touch sensing apparatus 100. Namely, the top location is near user and the bottom location is away from user. Besides, the data shielding line DLS1$a$ and the data shielding line DLS1$b$ can be arranged at arbitrary locations as long as they can sandwich the data line DL therein. For example, the data shielding line DLS1$a$ and the data shielding line DLS1$b$ can be placed at the right side and the left side of the data line DL respectively. Besides, if the major source of noise is from a particular side (such as bottom side), the fingerprint-touch sensing apparatus 100 of the present disclosure may have a single data shielding line for a data line. As shown in FIG. 5A, the provision of the data shielding line DLS1$a$ and the data shielding line DLS1$b$ may shield the noise around the data line DL.

With reference now to FIGS. 4A and 5B, if the capacitance-sensing signal Sc, which is associated with and from the capacitance sensing result of the selected sensing electrode(s), is amplified by the driver circuit A1 with gain larger than or equal to zero into shielding signal Sb, and the shielding signal Sb is applied to data shielding line DLS1$a$ and the data shielding line DLS1$b$ near the data line DL, then the first capacitance C1 between the data shielding line DLS1$a$ and data line DL1 is zero or near zero; while the second capacitance C2 between the data shielding line DLS1$b$ and data line DL1 is zero or near zero. Therefore, the provision of the data shielding line DLS1$a$ and the data shielding line DLS1$b$ and the application of suitable bias can reduce cross talk for the output fingerprint sensing signal and enhance sensing accuracy. The fingerprint-touch sensing apparatus 100 of the present disclosure may more precisely sense the induced capacitance, namely the result caused by the pressing of user finger (or stylus) on or above the sensing electrodes and output through the data line DL. In above description for shielding, the gain of the driver circuit A1 is larger than or equal to zero. In fingerprint sensing or touch sensing, the gain of the driver circuit A1 is larger than zero (such as one) to provide non-inverting amplification to the capacitance-sensing signal Sc.

With reference now to FIG. 4A, the fingerprint-touch sensing apparatus 100 of the present disclosure further includes a plurality of capacitance-shielding signal switch circuits 43. The shielding signal Sb output from the fingerprint-touch sensing control integrated circuit 40 may be further sent to the capacitance-shielding signal switch circuits 43 through the capacitance-signal shielding lines CLS to selectively apply to the corresponding data shielding line DLS. For example, the shielding signal Sb output from the capacitance-signal shielding lines CLS1 may be sent to the data shielding lines DLS1$a$, DLS1$b$ through the capacitance-shielding signal switch circuits 43, or sent to the data shielding lines DLS2$a$, DLS2$b$ through the capacitance-shielding signal switch circuits 43.

Figure 4B:
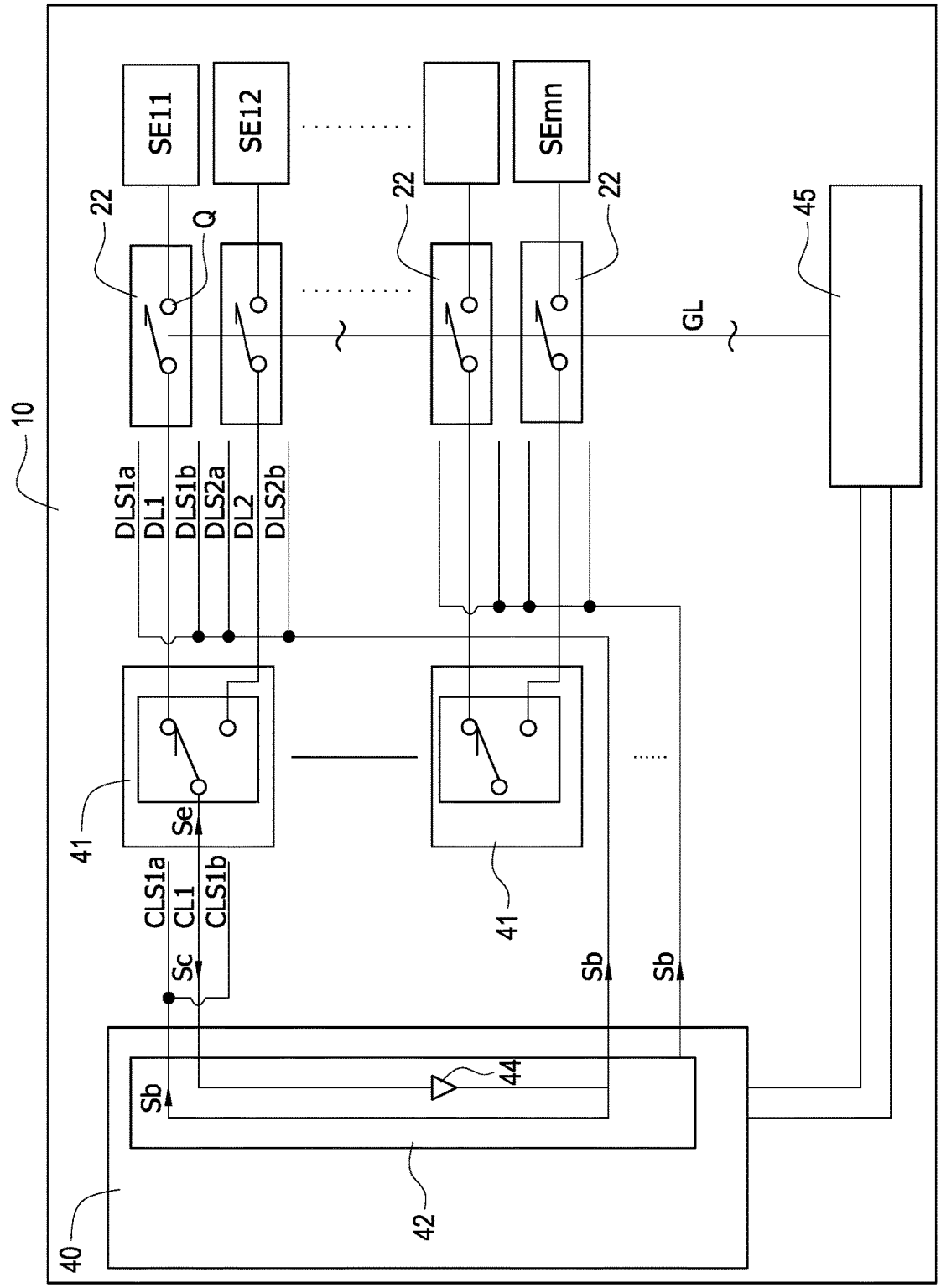
FIG. 4B shows another circuit diagram illustrating the operation of the fingerprint-touch sensing apparatus.

FIG. 4B shows another circuit diagram illustrating the operation of the fingerprint-touch sensing apparatus 100. The circuit shown in FIG. 4B is similar to that shown in FIG. 4A. However, the multiplexer 41' in FIG. 4A is replaced by a shift register 45 in FIG. 4B. According to an embodiment of the present disclosure, the fingerprint-touch sensing control integrated circuit 40 may send the gate control signal to the electrode switch circuits 22 through the shift register 45 to saving wirings. For example, the shift register 45 may sequentially select one or more column of sensing electrodes to conduct fingerprint sensing or touch sensing. By above scheme, the fingerprint-touch sensing apparatus 100 of the present disclosure may use the fingerprint-touch sensing control integrated circuit 40 to flexible select a single sensing electrode or organize a sensing electrode array (matrix) to sense, thus achieve a fingerprint-touch sensing apparatus with both large-area fingerprint sensing and touch sensing.

Figure 4C:
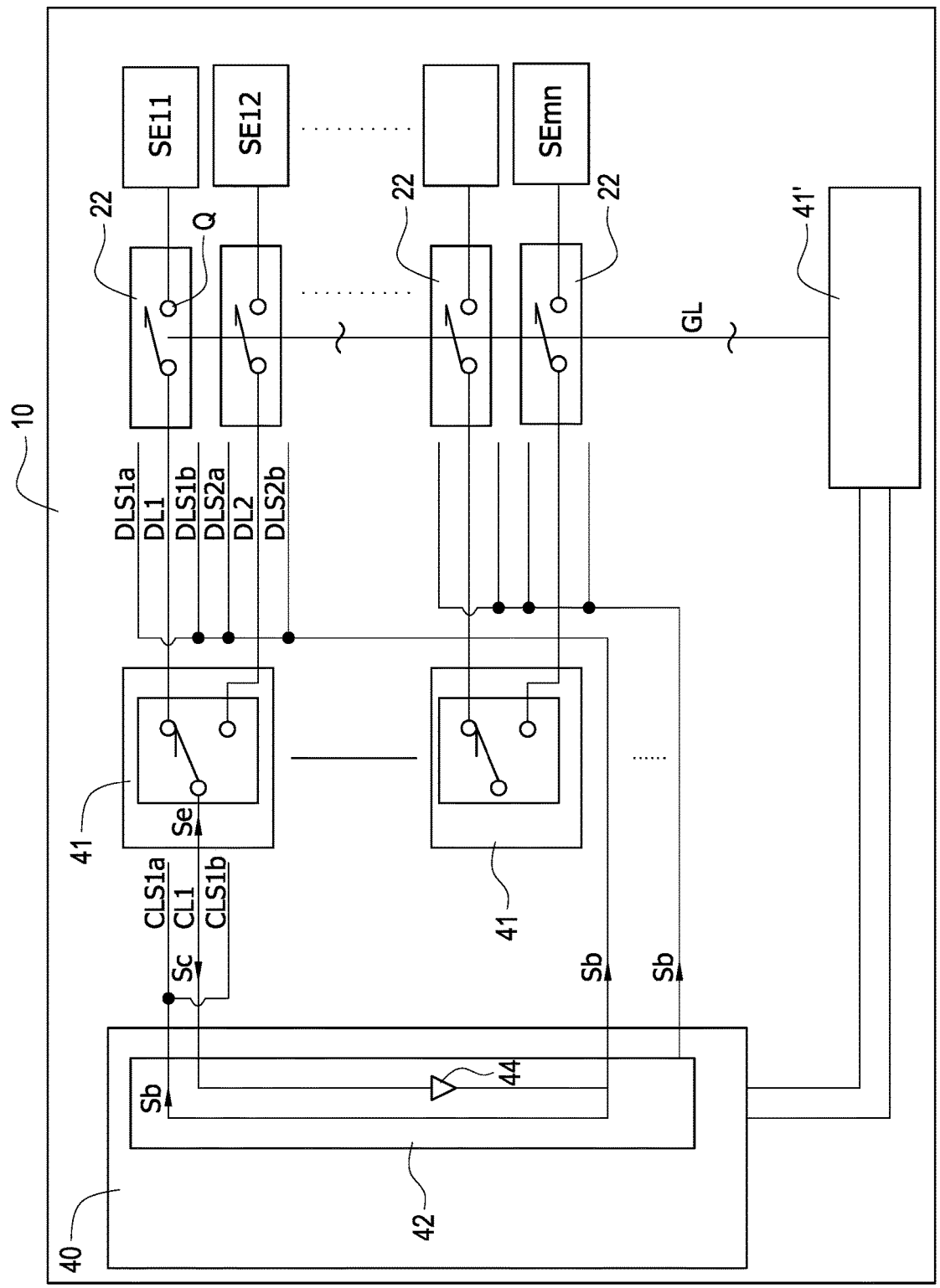
FIG. 4C shows still another circuit diagram illustrating the operation of the fingerprint-touch sensing apparatus.

FIG. 4C shows still another circuit diagram illustrating the operation of the fingerprint-touch sensing apparatus 100. The circuit shown in FIG. 4C is similar to that shown in FIG. 4A. However, the embodiment shown in FIG. 4C does not have the capacitance-shielding signal switch circuits 43. Namely, the shielding signal Sb sent from the capacitance-signal shielding lines CLS1 may supply to all of the data shielding lines DLS1$a$, DLS1$b$ and the data shielding lines DLS2$a$, DLS2$b$. Besides, for the embodiments shown in FIGS. 4A, 4B and 4C, the function of the present disclosure can be still fulfilled if the multiplexer 41' and the shift register 45 are dispensed with. Simply put, based on the reasons of aspect ratio of the whole sensing electrode layer and the circuit layout, the number of the gate lines GL is much fewer than that of the data lines DL. In this case, the fingerprint-touch sensing control integrated circuit 40 may directly control the gate lines GL to select one column or multiple columns of sensing electrodes.

Figure 1B:
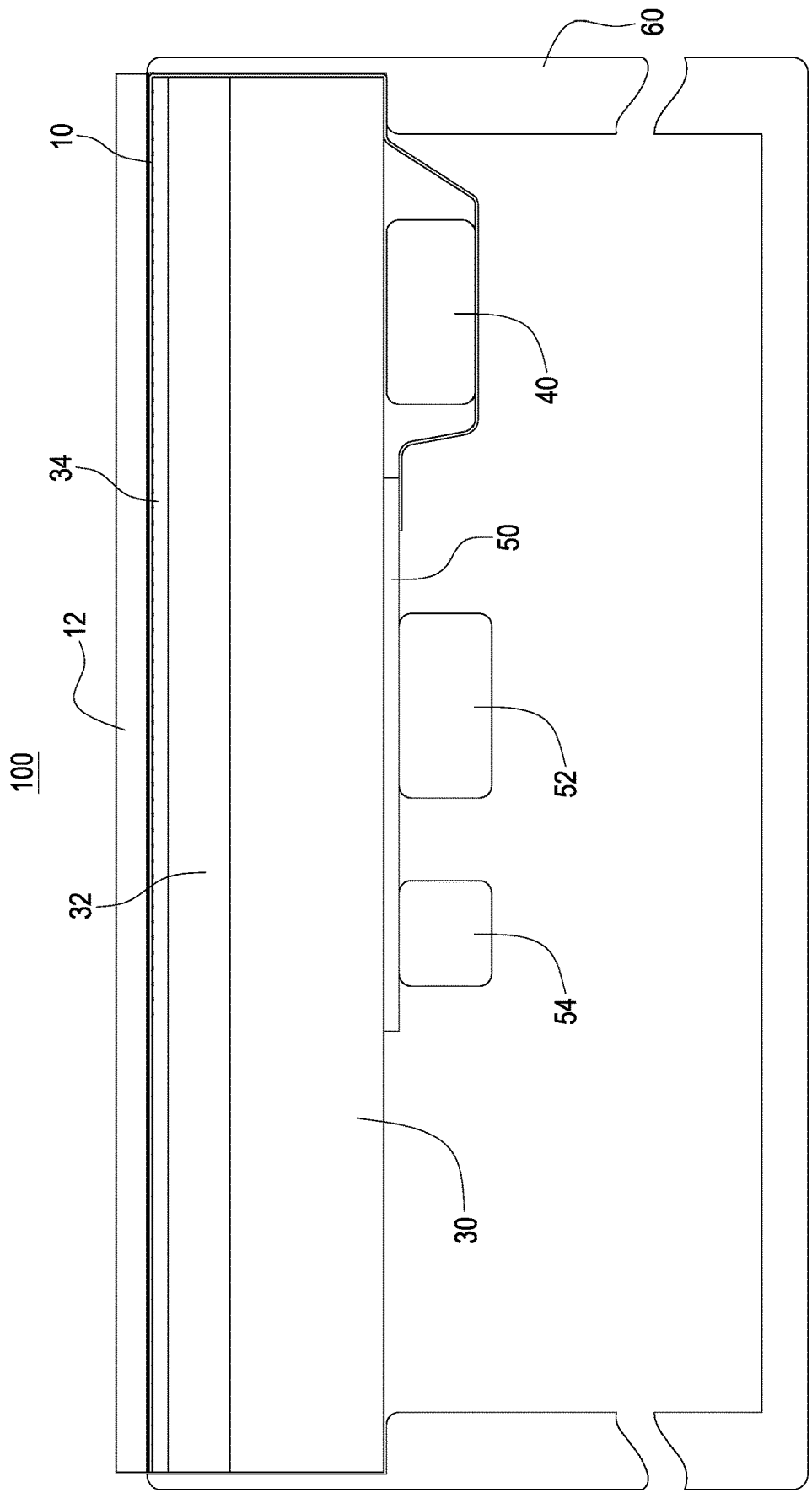
FIG. 1B shows a sectional view of the fingerprint-touch sensing apparatus according to another embodiment of the present disclosure.
Figure 2B:
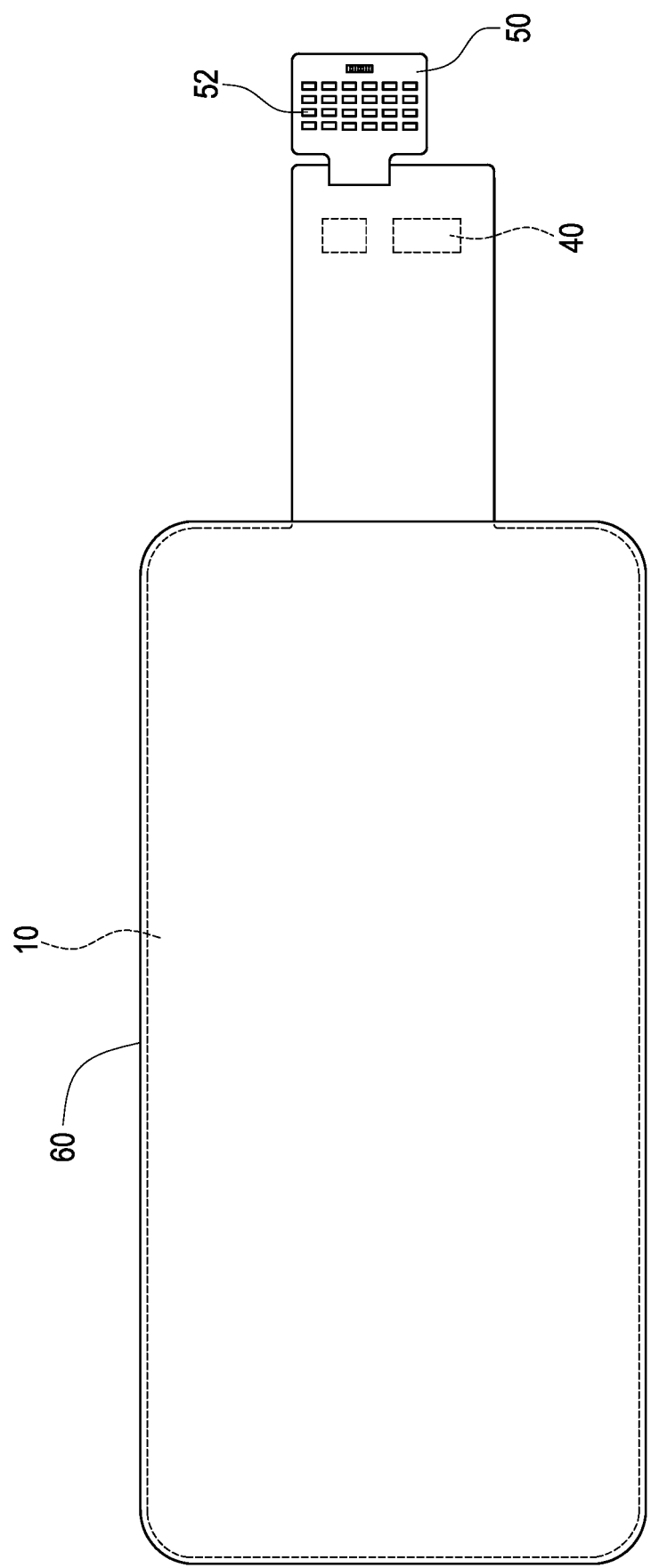
FIG. 2B shows the top view of partial components of the fingerprint-touch sensing apparatus corresponding to FIG. 1B.

FIG. 1B shows a sectional view of the fingerprint-touch sensing apparatus 100 according to another embodiment of the present disclosure. FIG. 2B shows the top view of partial components of the fingerprint-touch sensing apparatus 100 corresponding to FIG. 1B. The embodiment shown in FIG. 1B more concretely depicts the layered relationship between the fingerprint-touch sensing apparatus 100 of the present disclosure and other elements during fabrication. The fingerprint-touch sensing apparatus 100 includes, from top (near user operation direction) to bottom, a protection layer 12, a substrate 10, a sensing electrode layer 20, an optical clear adhesive (OCA) layer 34, a protection glass layer 32, a display 30 and an outer frame 60. Besides, the fingerprint-touch sensing apparatus 100 further includes a fingerprint-touch sensing control integrated circuit 40 arranged on one face of the substrate 10, a flexible circuit board 50 with one end attached to one side of the substrate 10, and passive elements 52, connectors 54 arranged on the flexible circuit board 50. Even not clearly shown in FIG. 1B, the sensing electrode layer 20 in this figure may have the sensing electrode SE and the electrode switch circuits 22 same as those shown in FIG. 1A and having similar grown way.

Similarly, in the fingerprint-touch sensing apparatus 100 shown in FIGS. 1B and 2B, the sensing electrodes SE and related circuit may have the configuration and layout as those shown in FIGS. 3A-3C, 4A-4C and 5A-5B. Therefore, the fingerprint-touch sensing control integrated circuit 40 in the fingerprint-touch sensing apparatus 100 shown in FIGS. 1B and 2B may also use the capacitance-signal switch circuits 41 to select a specific row of sensing electrodes and use the gate line to select a specific column of sensing electrodes to precisely sense the valley/peak information in corresponding fingerprint. Besides, the fingerprint-touch sensing control integrated circuit 40 may also use the capacitance-signal switch circuits 41 to select multiple rows of sensing electrodes and use the gate line to control the multiple electrode switch circuits 22 to select multiple columns of sensing electrodes to organize a sensing electrode array roughly in array manner. Therefore, it can rapidly sense whether overall capacitance change occurs in a sensing electrode array (namely, a single logical sensing electrode) to achieve touch sensing.

In the embodiments shown in FIGS. 1A-1B, 2A-2B, 3A-3C, 4A-4C and 5A-5B, the fingerprint-touch sensing apparatus 100 may be applied to the display 30 of portable electronic devices (such as smart phone). Therefore, the transistor switches Q may be transparent thin film transistors. Besides, the data lines DL and the gate lines GL may be transparent conductive wires or metal conductive lines with width not larger than 10 um. The substrate 10 may be the protection glass of a display screen of the display 30.

FIG. 1C shows a sectional view of the fingerprint-touch sensing apparatus 100 according to still another embodiment of the present disclosure. This embodiment is, for example, applied to a touch pad of computer; namely, the substrate 10 is non-transparent material. The fingerprint-touch sensing apparatus 100 shown in FIG. 1C includes, from top (near user operation direction) to bottom, a protection layer 12 (such as a hard film), a sensing electrode layer 20 and a substrate 10. Besides, the fingerprint-touch sensing apparatus 100 further includes a flexible circuit board 50 with one end attached to one side of the substrate 10 and a fingerprint-touch sensing control integrated circuit 40 arranged on one face of the flexible circuit board 50. FIG. 1D shows a sectional view of the fingerprint-touch sensing apparatus 100 according to still another embodiment of the present disclosure. This embodiment is, for example, also applied to a touch pad of computer; namely, the substrate 10 is non-transparent material. The fingerprint-touch sensing apparatus 100 shown in FIG. 1D is similar to that shown in FIG. 1C; however, the fingerprint-touch sensing control integrated circuit 40 shown in FIG. 1D is arranged on the substrate 10.

Similarly, in the fingerprint-touch sensing apparatus 100 shown in FIGS. 1C~1D, the sensing electrodes SE and related circuit may have the configuration and layout same as those shown in FIGS. 3A-3C, 4A-4C and 5A-5B. Therefore, the fingerprint-touch sensing control integrated circuit 40 in the fingerprint-touch sensing apparatus 100 shown in FIGS. 1C and 1D may also use the capacitance-signal switch circuits 41 to select a specific row of sensing electrodes and use the gate line to select a specific column of sensing electrodes to precisely sense the valley/peak information in corresponding fingerprint. Besides, the fingerprint-touch sensing control integrated circuit 40 may also use the capacitance-signal switch circuits 41 to select multiple rows of sensing electrodes and use the gate line to control the multiple electrode switch circuits 22 to select multiple columns of sensing electrodes to organize a sensing electrode array roughly in matrix manner. Therefore, it can rapidly sense whether overall capacitance change occurs in a sensing electrode array (namely, a single logical sensing electrode) to achieve touch sensing. However, the embodiments shown in FIGS. 1C and 1D are applied to non-transparent touch pad; therefore, the substrate can be glass, while the data lines DL and the gate lines GL may be non-transparent material (such as metal conductive lines).

Besides, in above embodiments, the fingerprint-touch sensing control integrated circuit 40 may include a plurality set of self-capacitance measuring circuits to perform parallel sensing and enhance sensing efficiency. The number of the fingerprint-touch sensing control integrated circuit 40 may be plural and arranged respectively on two opposite sides of the substrate. Even though the present disclosure is exemplified with self-capacitance measuring circuit, the fingerprint-touch sensing apparatus of the present disclosure may also adopt mutual-capacitance measuring circuit. In above embodiments, the similarity between the shielding signal and the capacitance-sensing signal is not less than 90%. The above "similarity" is, for example, that the amplitude difference and phase difference between the shielding signal and the capacitance-sensing signal are smaller than or equal to 10%. Besides, by controlling the gate lines and the data lines, specific rows and columns of sensing electrodes can be selected to constitute a sensing electrode array. According to one aspect of the present disclosure, the area of the sensing electrode array is smaller than 1 square millimeter (1 mm$^2$). Therefore, the fingerprint-touch sensing apparatus 100 of the present disclosure may be applied to pen-like input such as handwriting input with pencil, metal pen, ball pen or non-metal pen. The overall area of multiple sensing electrodes (such as the sensing electrode array in this disclosure) can cover at least two user fingers (for example, the length along one dimension of the sensing electrode array is longer than 1 cm), thus provide multi-finger sensing function.

To sum up, the fingerprint-touch sensing apparatus of the present disclosure has at least following advantages:

1. By providing a plurality of multiple-to-one capacitance-signal switch circuits and a plurality of electrode switch circuits, capacitance change can be flexibly sensed for a single sensing electrode, or multiple sensing electrode (such as a sensing electrode array). Therefore, fingerprint sensing and touch sensing can be flexibly performed under the same physical sensing electrode architecture.

2. The adjacent columns or adjacent rows of sensing electrodes can be staggered to each other such that at least four sensing electrodes can be sensed at the same time to enhance sensing accuracy.

3. Each of the data line or the gate line has at least one zigzag portion to enhance displaying effect and make the material selection more flexible.

4. The area of each sensing electrode SE is not larger than 40,000 square micrometers; the multiplexer and the electrode switch circuits may be employed to organize multiple sensing electrodes into a sensing electrode array. Therefore, the fingerprint can be precisely sensed and the sensing efficiency is not influenced.

5. By providing data shielding lines and capacitance-signal shielding lines, the noise to the data line and capacitance-signal can be blocked or shielded. By sending shielding signal with the same frequency and the same phase as the capacitance-sensing signal to the data shielding lines and capacitance-signal shielding lines, the effect of the stray capacitance can be eliminated and the interference can be reduced, thus enhance signal to noise ratio and sensing accuracy.

While this disclosure has been described by means of specific embodiments, numerous modifications and variations may be made thereto by those skilled in the art without departing from the scope and spirit of this disclosure set forth in the claims.

What is claimed is:

1. A fingerprint-touch sensing apparatus comprising:
   a substrate;
   a sensing electrode layer arranged on one side of the substrate, the sensing electrode layer comprising:
   a plurality of sensing electrodes arranged in multiple columns and multiple rows;
   a plurality of electrode switch circuits, each of the electrode switch circuits being corresponding to one of the sensing electrodes and comprising at least one transistor switch;
   a plurality of data lines extended along a first direction, each of the data lines being connected to the electrode switch circuits;
   a plurality of gate lines extended along a second direction, each of the gate lines being connected to the electrode switch circuits;
   a plurality of capacitance-signal lines arranged on lateral side of the substrate;
   a plurality of data shielding lines arranged beside each of the data lines, each of the data lines being corresponding to at least one of the data shielding lines;
   a plurality of capacitance-signal shielding lines arranged beside each of the capacitance-signal lines, each of the capacitance-signal lines being corresponding to at least one of the capacitance-signal shielding lines; and
   a plurality of capacitance-signal switch circuits arranged on lateral side of the substrate, each of the capacitance-signal switch circuits being connected to at least one of the data lines and at least one of the capacitance-signal lines;
   a fingerprint-touch sensing control integrated circuit configured to control the capacitance-signal switch circuits and the electrode switch circuits to sequentially or randomly select one or a plurality of the sensing electrodes for conducting fingerprint sensing or touch sensing; and
   a flexible circuit board with one end connected to one side of the substrate.

2. The fingerprint-touch sensing apparatus in claim 1, further comprises a panel display comprising a display screen, the substrate is placed on a side of the display screen facing a user to facilitate fingerprint sensing or touch sensing, the sensing electrode layer covers a display area of the panel display, the plurality of sensing electrodes being transparent conductive electrodes.

3. The fingerprint-touch sensing apparatus in claim 2, wherein the sensing electrodes of adjacent columns or the sensing electrodes of adjacent rows are staggered to each other.

4. The fingerprint-touch sensing apparatus in claim 2, wherein the transistor switches are transparent thin film transistor switches.

5. The fingerprint-touch sensing apparatus in claim 2, wherein the data lines and the gate lines are transparent conductive lines or metal conductive lines with line width no more than 10 µm.

6. The fingerprint-touch sensing apparatus in claim 2, wherein the data lines or the gate lines have zigzag portion to enhance displaying effect.

7. The fingerprint-touch sensing apparatus in claim 2, wherein a number of the fingerprint-touch sensing control integrated circuit is plural.

8. The fingerprint-touch sensing apparatus in claim 2, wherein the substrate is a protection glass of the display screen.

9. The fingerprint-touch sensing apparatus in claim 2, further comprising a protection layer.

10. The fingerprint-touch sensing apparatus in claim 2, wherein the side of the display screen on which a face of the substrate having the sensing electrode layer is arranged faces the user, the other face of the substrate without the sensing electrode layer faces the user.

11. The fingerprint-touch sensing apparatus in claim 1, wherein the substrate comprises one or more bending.

12. The fingerprint-touch sensing apparatus in claim 1, further comprising a plurality of passive elements on the flexible circuit board.

13. The fingerprint-touch sensing apparatus in claim 1, wherein an area of each of the sensing electrodes is not larger than 40,000 square micrometers.

14. The fingerprint-touch sensing apparatus in claim 1, wherein a total area of the plurality of sensing electrodes is at least a sum area of two user fingers.

15. The fingerprint-touch sensing apparatus in claim 1, wherein the substrate is made of glass or transparent polymer.

16. The fingerprint-touch sensing apparatus in claim 1, wherein a sensing area of the plurality of the sensing electrodes is at least smaller than 1 square millimeter.

17. The fingerprint-touch sensing apparatus in claim 1, wherein the fingerprint-touch sensing control integrated circuit comprises a plurality of self-capacitance sensing circuits for conducting parallel sensing to enhance sensing efficiency.

18. The fingerprint-touch sensing apparatus in claim 17, wherein one of the plurality of self-capacitance sensing circuits is configured to send a capacitance-excitation signal to at least selected one of the data lines through one of the capacitance-signal lines and one of the capacitance-signal switch circuits, and then send the capacitance-excitation signal to at least selected one of the sensing electrodes through one of the electrode switch circuits; and at the same time to receive a capacitance-sensing signal from the selected sensing electrode through the selected electrode switch circuits, the at least selected one of the data lines, the capacitance-signal switch circuit and the capacitance-signal line to conduct fingerprint sensing or touch sensing.

19. The fingerprint-touch sensing apparatus in claim 18, wherein each of the plurality of self-capacitance sensing circuits is configured to send a shielding signal having a same frequency and a same phase as that of the capacitance-sensing signal to the corresponding data shielding line to eliminate stray capacitance and reduce interference and to enhance signal to noise ratio and sensing accuracy.

20. The fingerprint-touch sensing apparatus in claim 1, further comprising a plurality of capacitance-shielding signal switch circuits arranged on lateral side of the substrate, wherein each of the capacitance-shielding signal switch circuits is connected to the plurality of data shielding line and at least one of the capacitance-signal shielding lines.

21. The fingerprint-touch sensing apparatus in claim 19, wherein a similarity between the shielding signal and the capacitance-sensing signal is not less than 90 percent.

22. The fingerprint-touch sensing apparatus in claim 1, wherein the substrate is a super-thin glass or polyimide.

\* \* \* \* \*